(12) United States Patent
Takahashi et al.

(10) Patent No.: US 12,495,531 B2
(45) Date of Patent: Dec. 9, 2025

(54) ELECTRONIC APPARATUS

(71) Applicant: Lenovo (Singapore) Pte. Ltd., Singapore (SG)

(72) Inventors: Daisuke Takahashi, Kanagawa (JP); Tetsuya Sano, Kanagawa (JP); Tabito Miyamoto, Kanagawa (JP); Takayuki Morino, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 365 days.

(21) Appl. No.: 18/191,879

(22) Filed: Mar. 29, 2023

(65) Prior Publication Data

US 2023/0413498 A1    Dec. 21, 2023

(30) Foreign Application Priority Data

May 17, 2022  (JP) .................... 2022-080887

(51) Int. Cl.
| | |
|---|---|
| *H05K 9/00* | (2006.01) |
| *G06F 1/16* | (2006.01) |
| *H01Q 1/24* | (2006.01) |
| *H05K 5/02* | (2006.01) |

(52) U.S. Cl.
CPC ......... *H05K 9/0018* (2013.01); *G06F 1/1656* (2013.01); *H01Q 1/243* (2013.01); *H05K 5/0247* (2013.01)

(58) Field of Classification Search
CPC .. H05K 9/0018; H05K 5/0247; G06F 1/1656; G06F 1/1641; G06F 1/1652; G06F 1/1688; G06F 1/1698; H01Q 1/243; H01Q 1/22; H01Q 1/526
See application file for complete search history.

(56) References Cited

U.S. PATENT DOCUMENTS

| | | | | |
|---|---|---|---|---|
| 7,379,025 | B2 * | 5/2008 | Asano ................ | H01Q 9/42 343/702 |
| 7,389,121 | B2 * | 6/2008 | Sipila ................ | H04W 36/10 455/432.1 |
| 8,583,187 | B2 * | 11/2013 | Kim .................. | G06F 1/1656 361/679.01 |
| 8,888,008 | B2 * | 11/2014 | Teshima ............ | H01Q 1/2225 235/492 |
| 10,667,442 | B2 * | 5/2020 | Nakata .............. | G06F 1/20 |
| 10,720,693 | B2 * | 7/2020 | Yamamoto ........ | G06F 1/1616 |
| 10,992,027 | B2 * | 4/2021 | Yamamoto ........ | H01Q 1/243 |

(Continued)

FOREIGN PATENT DOCUMENTS

| | | |
|---|---|---|
| JP | 2020-099004 A | 6/2020 |
| JP | 2020-120298 A | 8/2020 |
| JP | 2021-089481 A | 6/2021 |

*Primary Examiner* — Davetta W Goins
(74) *Attorney, Agent, or Firm* — Osha Bergman Watanabe & Burton LLP

(57) ABSTRACT

An electronic apparatus includes: a chassis side surface formed by a chassis member; an electromagnetic shielding wall of a radio wave non-transmissive material formed by the chassis member; a component installation space located between the chassis side surface and the electromagnetic shielding wall; and an antenna module and an electrical component arranged in the component installation space. The electromagnetic shielding wall at least covers laterally an antenna element in the antenna module.

14 Claims, 10 Drawing Sheets

(56) References Cited

U.S. PATENT DOCUMENTS

| | | | |
|---|---|---|---|
| 2017/0142823 A1* | 5/2017 | Shim | G06F 1/1656 |
| 2021/0243925 A1* | 8/2021 | Ramasamy | H05K 9/0015 |
| 2022/0200154 A1* | 6/2022 | Thakur | H05K 1/0237 |

* cited by examiner

ELECTRONIC APPARATUS

CROSS-REFERENCE TO RELATED APPLICATIONS

This application claims priority to Japanese Patent Application No. 2022-80887 filed on May 17, 2022, the contents of which are hereby incorporated herein by reference in their entirety.

TECHNICAL FIELD

The present invention relates to an electronic apparatus including an antenna in a chassis.

BACKGROUND

Electronic apparatuses such as laptop personal computers and tablets include antenna modules for various types of wireless communication such as wireless local area network (WLAN) (see Japanese Unexamined Patent Application Publication No. 2020-99004).

An antenna module needs to be electromagnetically shielded from a motherboard, and has a structure including an electromagnetic shielding wall as described in Japanese Unexamined Patent Application Publication No. 2020-99004. Thus, the antenna module itself includes an electromagnetic shielding wall and a fixing portion for a chassis, and therefore has a certain size. There is, however, a demand for size reduction of electronic apparatuses, and it is desirable to provide the antenna module in a space-saving manner.

In the case where the electronic apparatus includes a relatively large electrical component such as a speaker and the electrical component and the antenna module are located adjacent to each other in layout, the electrical component and the antenna module are basically separated by an electromagnetic shielding wall or the like and are apart from each other by at least the thickness of the wall. This increases the size of the chassis.

SUMMARY

One or more embodiments of the present invention provide an electronic apparatus that enables space-saving arrangement of an antenna module and an electrical component.

An electronic apparatus according to one or more embodiments of the present invention includes: a chassis side surface formed by a chassis member; an electromagnetic shielding wall of a radio wave non-transmissive material formed by the chassis member; a component installation space located between the chassis side surface and the electromagnetic shielding wall; and an antenna module and an electrical component arranged in the component installation space, wherein the electromagnetic shielding wall at least covers laterally an antenna element in the antenna module.

According to the above-described aspects of the present invention, the component arrangement space in which the antenna module and the electrical component are arranged is laterally covered with the electromagnetic shielding wall, and thus the antenna module itself does not require electromagnetic shielding means such as a wall. This enables reduction in size and thickness. There is a degree of freedom in arranging the antenna module and the electrical component in the component arrangement space, and shielding means corresponding to an electromagnetic shielding wall is not necessary at least between the antenna module and a speaker, with it possible to save space.

DETAILED DESCRIPTION OF THE INVENTION

Embodiments of an electronic apparatus according to the present invention will be described in detail below, with reference to the drawings. The present invention is not limited by these embodiments.

Figure 1:
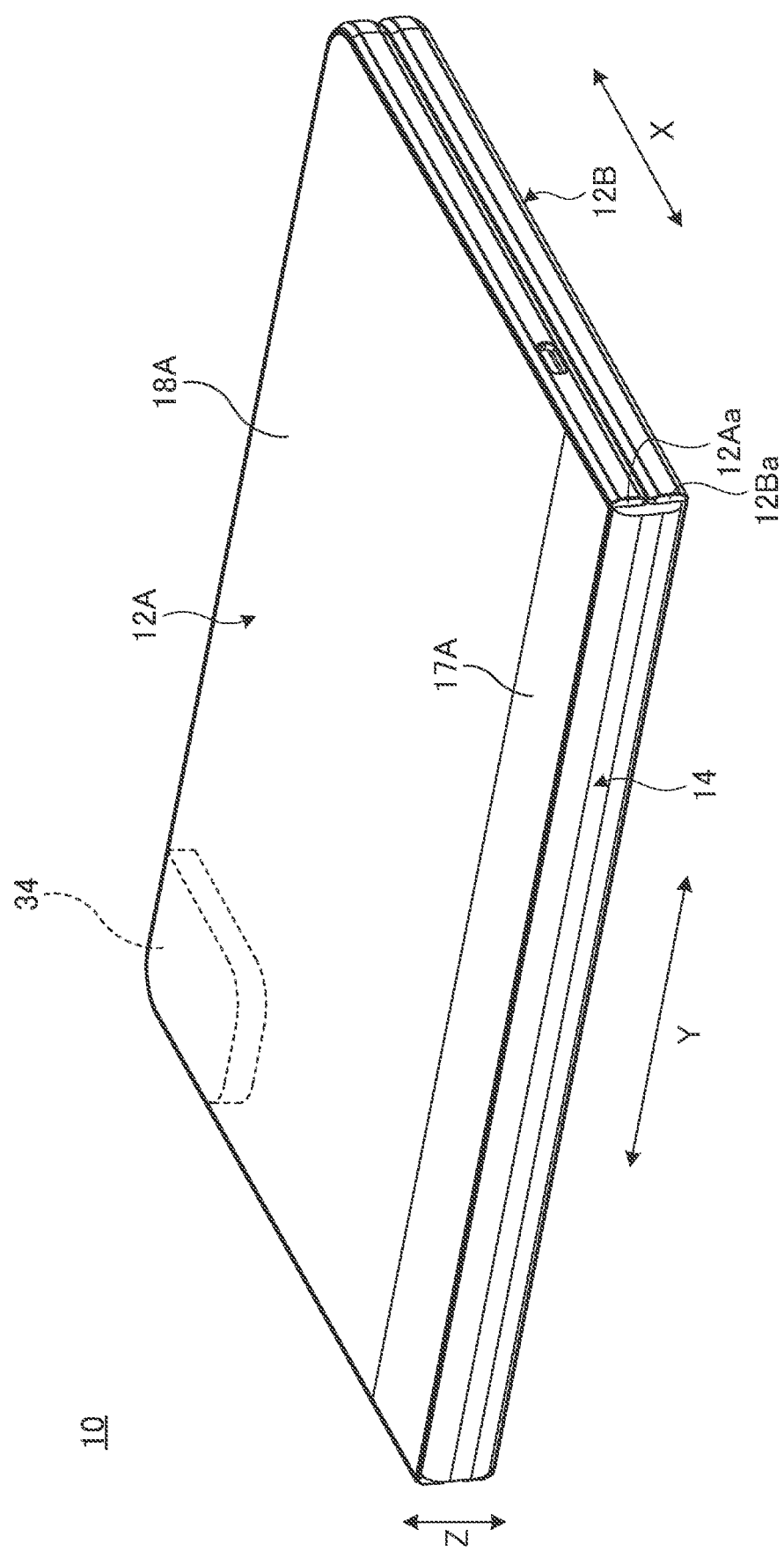
FIG. 1 is a perspective view schematically illustrating a state in which an electronic apparatus according to one or more embodiments is closed to be in a 0-degree posture.
Figure 2:
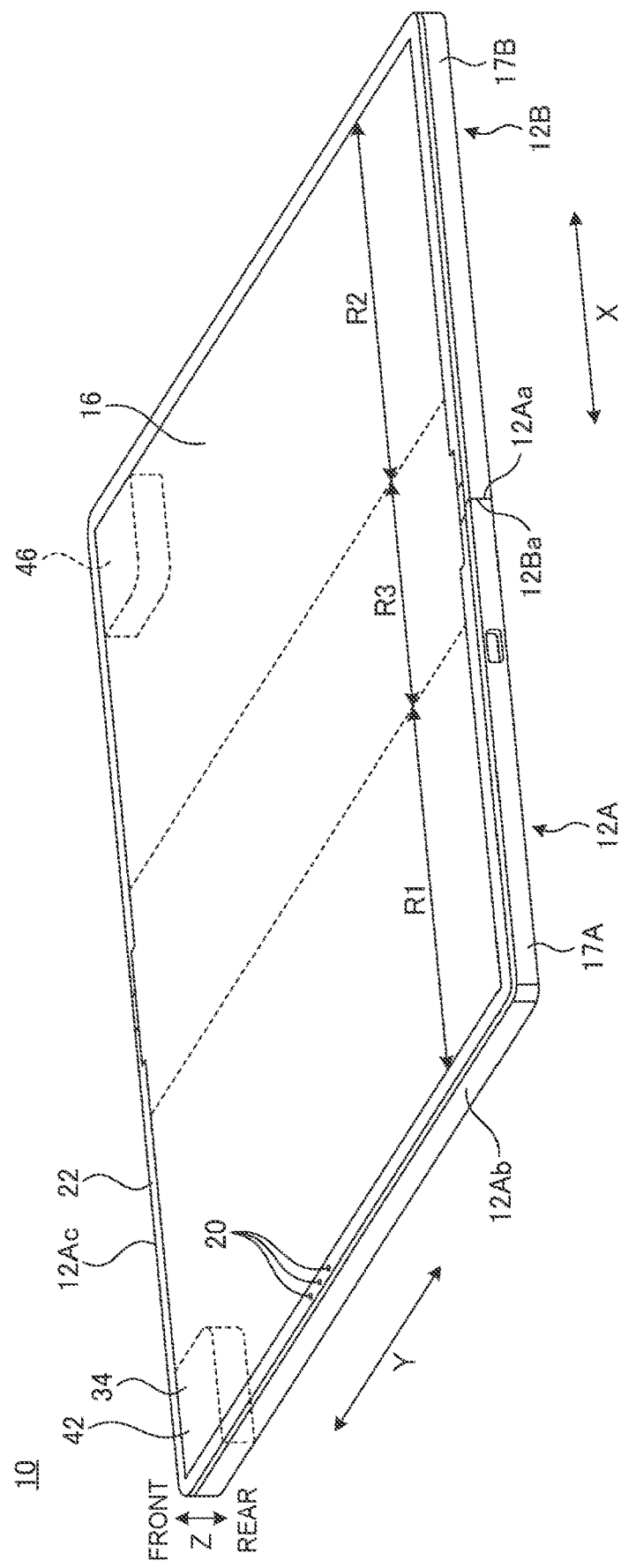
FIG. 2 is a perspective view schematically illustrating a state in which the electronic apparatus illustrated in FIG. 1 is opened to be in a 180-degree posture.

FIG. 1 is a perspective view schematically illustrating a state in which an electronic apparatus 10 according to one or more embodiments is closed to be in a 0-degree posture. FIG. 2 is a perspective view schematically illustrating a state in which the electronic apparatus 10 illustrated in FIG. 1 is opened to be in a 180-degree posture.

As illustrated in FIGS. 1 and 2, the electronic apparatus 10 includes a first chassis 12A, a second chassis 12B, a hinge device 14, and a display 16. The electronic apparatus 10 in one or more embodiments is, for example, a tablet PC or a laptop PC that is foldable like a book. The electronic apparatus 10 may be a smartphone, a portable game machine, or the like.

The chassis 12A and 12B are adjacent to each other. The first chassis 12A includes a frame member 17A and a cover member 18A. The frame member 17A is a rectangular frame-shaped member having standing walls formed on three sides other than an adjacent edge 12Aa adjacent to the second chassis 12B. The cover member 18A is a plate-shaped member that closes the rear opening of the frame member 17A. Likewise, the second chassis 12B includes a frame member 17B having standing walls formed on three sides other than an adjacent edge 12Ba adjacent to the first chassis 12A, and a cover member 18B that closes the rear opening of the frame member 17B. The front openings of the frame members 17A and 17B are closed with the display 16.

Each of the members 17A, 17B, 18A, and 18B has a composite structure of, for example, a metal member such as stainless steel, magnesium, or aluminum (radio wave non-transmissive material) and a fiber-reinforced resin plate or the like containing reinforcement fiber such as carbon fiber (radio wave transmissive material). A composite structure of a metal material and a resin material for the frame member 17A and the cover member 18A will be described later.

The hinge device 14 connects the chassis 12A and 12B so as to be relatively rotatable between the 0-degree posture and the 180-degree posture. The hinge device 14 also functions as a back cover that hides the gap between the adjacent edges 12Aa and 12Ba formed in the 0-degree posture illustrated in FIG. 1.

For the electronic apparatus 10, the direction in which the chassis 12A and 12B are arranged is hereafter referred to as the X direction, the direction along the adjacent edges 12Aa and 12Ba orthogonal to the X direction as the Y direction, and the thickness direction of the chassis 12A and 12B as the Z direction. For the Z direction, the direction from the cover members 18A and 18B to the display 16 is also referred to as forward, and the opposite direction as rearward. For the angular posture between the chassis 12A and 12B, the state in which the chassis 12A and 12B are folded so as to overlap each other in the surface normal direction is referred to as the 0-degree posture (see FIG. 1), and the state in which the chassis 12A and 12B are arranged side by side in the direction (X direction) perpendicular to the surface normal direction as the 180-degree posture (see FIG. 2).

In the 0-degree posture illustrated in FIG. 1, the chassis 12A and 12B are folded in half. The display 16 is a paper-like flexible display made of organic EL. In the 0-degree posture, the display 16 is positioned so that a region R1 on the first chassis 12A side and a region R2 on the second chassis 12B side illustrated in FIG. 2 face each other, with a folding region R3 which is a boundary region between the regions R1 and R2 being bent in an arc shape. In the 180-degree posture illustrated in FIG. 2, the chassis 12A and 12B are arranged side by side. In this posture, the display 16 forms a flat plate shape as a whole, with the regions R1 and R2 and the folding region R3 being arranged side by side on the XY plane.

In the display 16, the region R1 is fixed relative to the first chassis 12A, and the region R2 is fixed relative to the second chassis 12B.

In the electronic apparatus 10, a bezel 22 is provided along the four edges of the display 16. The bezel 22 has a thin sheet shape, and is made of a radio wave transmissive material such as resin. In the first chassis 12A, an outer edge 12Ab is an edge facing the adjacent edge 12Aa and extending in the Y direction. The bezel 22 is a sheet-shaped thin resin material. A plurality of electronic devices 20 are provided in a substantially central part of the outer edge 12Ab. The electronic devices 20 include a camera and an infrared port. The bezel 22 has holes in front of the electronic devices 20.

Figure 3:
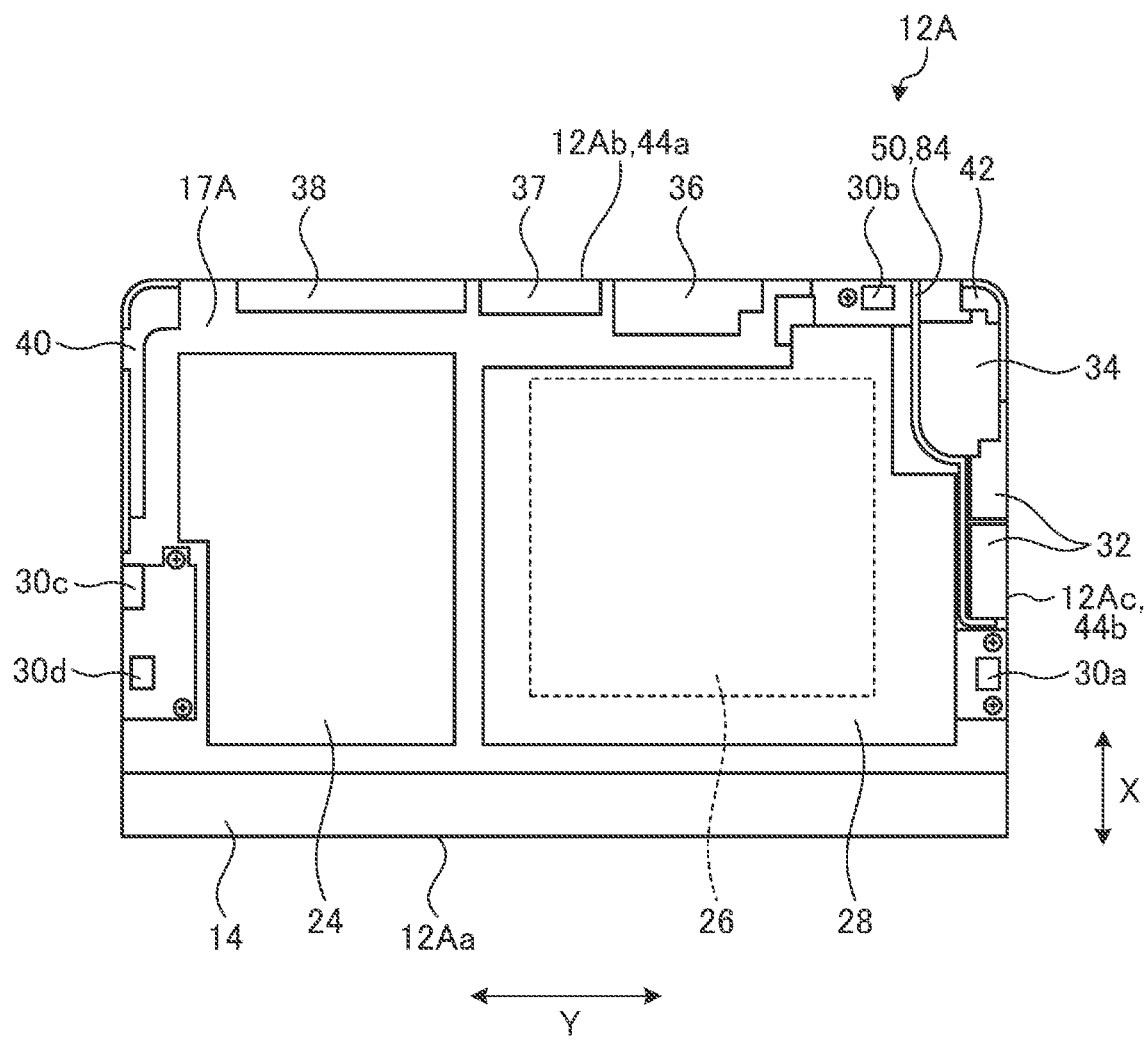
FIG. 3 is a schematic bottom view of a first chassis in a state in which a cover member has been removed to expose the inside.

FIG. 3 is a schematic bottom view of the first chassis 12A in a state in which the cover member 18A has been removed to expose the inside. A battery 24 occupying most of the left and a motherboard 26 and a heat spreader 28 occupying most of the right in FIG. 3 are stored inside the first chassis 12A. The motherboard 26 and the heat spreader 28 are laminated. The frame member 17A is configured to roughly surround the battery 24, the motherboard 26, and the heat spreader 28.

A plurality of devices are densely provided at the three edges other than the adjacent edge 12Aa in the first chassis 12A. Specifically, a connector 30a, a first antenna module 32 (hereafter also simply referred to as antenna module 32), a speaker (electrical component) 34, a connector 30b, a second antenna module 36, a device module 37, a third antenna module 38, a fourth antenna module 40, a connector 30c, and a connector 30d are arranged in this order counterclockwise from the bottom right corner in FIG. 3. The antenna modules 32, 36, 38, and 40 are, for example, WLAN, and differ in specifications such as frequency bands. The speaker 34 is located at the top right corner 42 in FIG. 3. The speaker 34 is relatively short in the Y direction and relatively long in the X direction, and relatively long in the X direction, with sufficient internal volume for suitable acoustic effects and has preferable acoustic effects. In the first chassis 12A, an edge 12Ac is an edge that intersects the outer edge 12Ab at the corner 42. In the frame member 17A, a chassis side surface 44a is a side surface forming the outer edge 12Ab, and a chassis side surface 44b is a side surface forming the edge 12Ac.

The fourth antenna module 40 is located at a position including the top left corner in FIG. 3. The connector 30b, the second antenna module 36, the device module 37, and the third antenna module 38 are arranged along the outer edge 12Ab. The device module 37 includes the foregoing plurality of electronic devices 20 (see FIG. 2). The speaker 34 and the antenna module 32 are adjacent to each other along the edge 12Ac, and partially overlap each other in a plan view. Thus, the dimension of the first chassis 12A in the X direction is shortened, and the devices can be laid out along the three edges other than the adjacent edge 12Aa. This will be described in more detail layer.

A speaker 46 (see FIG. 2) and a large battery (not illustrated) are stored inside the second chassis 12B. The speaker 34 and the speaker 46 are located symmetrically in the X direction, and form a stereo system as a pair.

Figure 4:
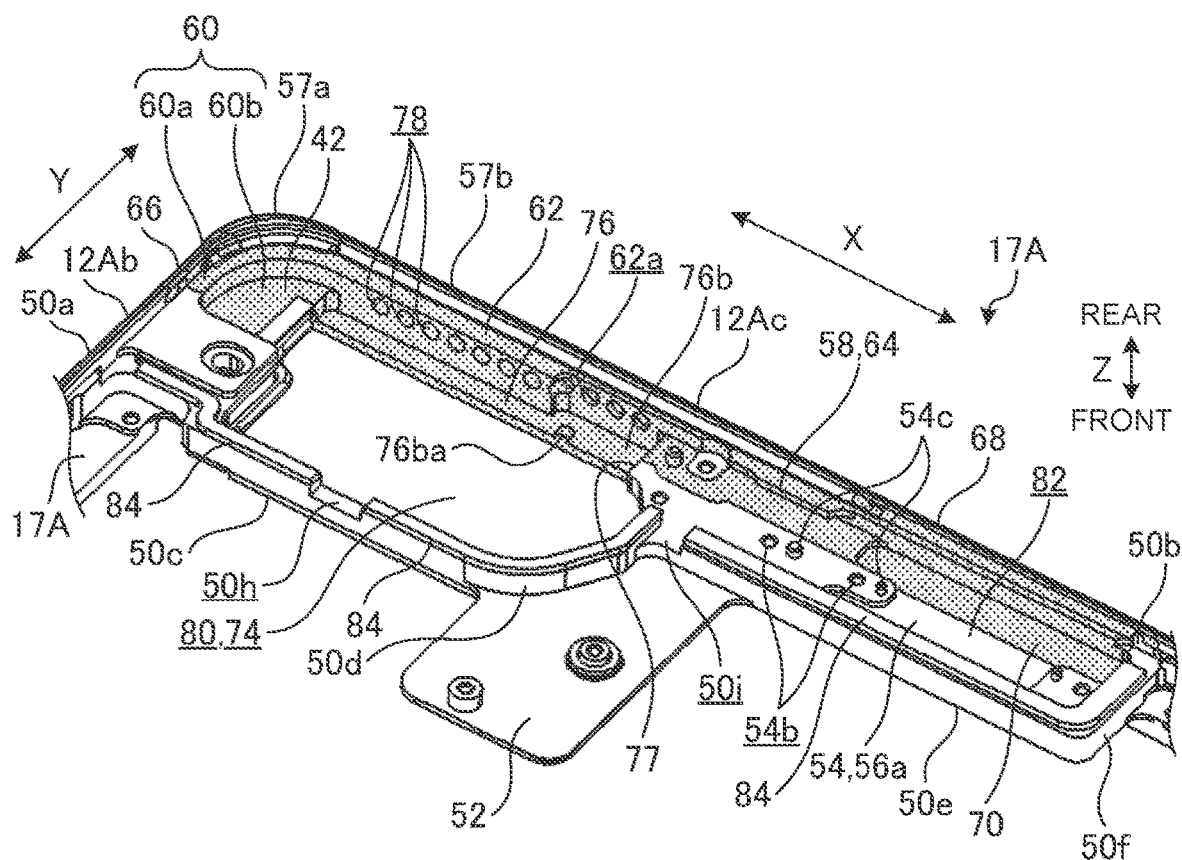
FIG. 4 is a perspective view of a corner and its surroundings in a frame member as seen from the inside of the frame from the rear.
Figure 5:
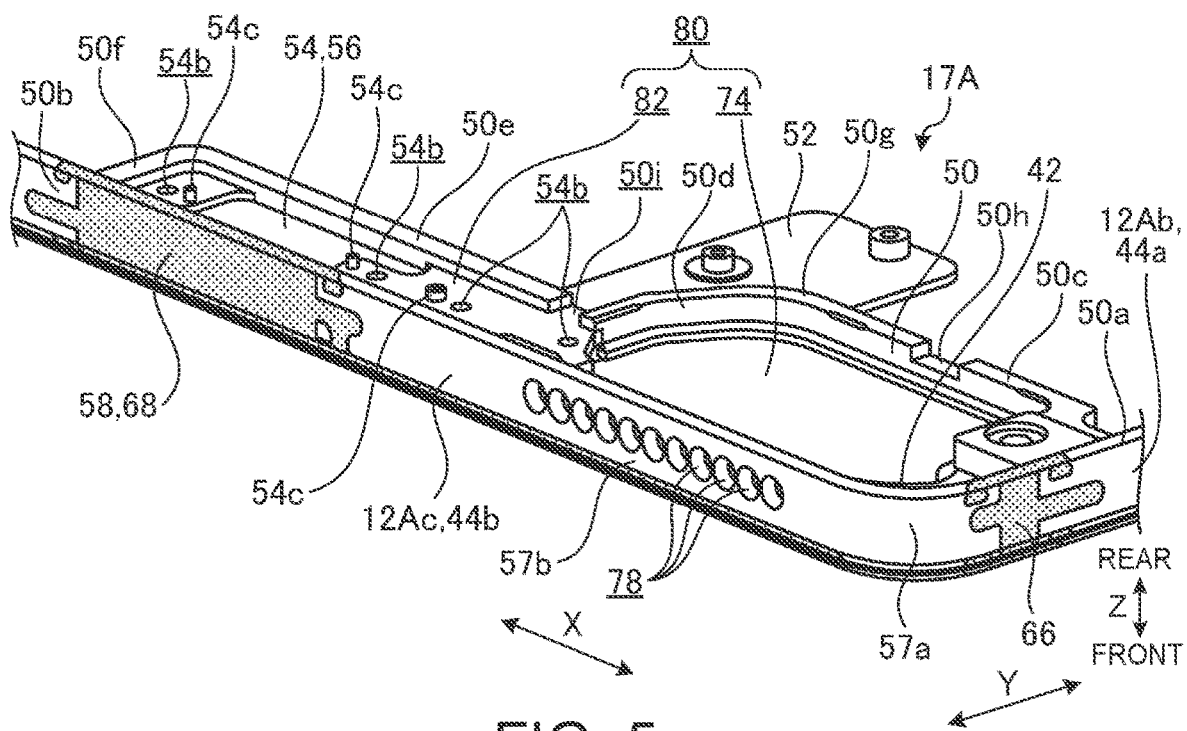
FIG. 5 is a perspective view of the corner and its surroundings in the frame member as seen from the outside of the frame from the rear.
Figure 6:
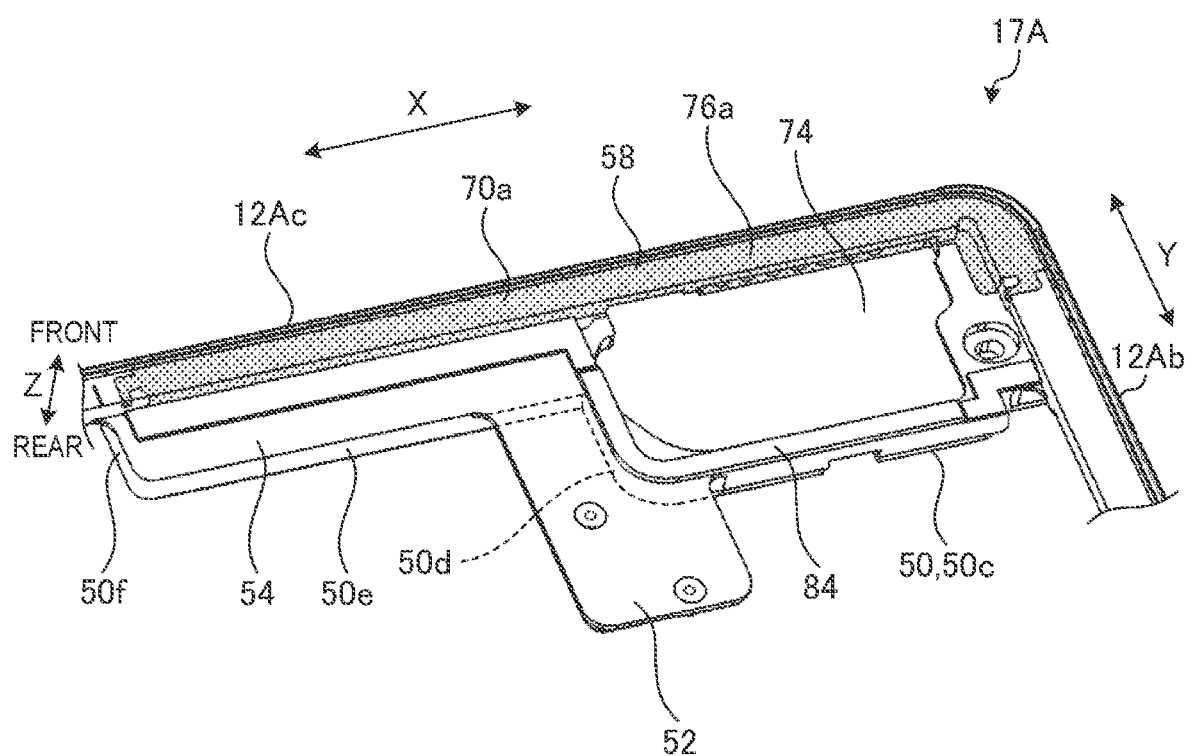
FIG. 6 is a perspective view of the corner and its surroundings in the frame member as seen from the front.

FIG. 4 is a perspective view of the corner 42 and its surroundings in the frame member 17A as seen from the inside of the frame from the rear. FIG. 5 is a perspective view of the corner 42 and its surroundings in the frame member 17A as seen from the outside of the frame from the rear. FIG. 6 is a perspective view of the corner 42 and its surroundings in the frame member 17A as seen from the front.

As illustrated in FIGS. 4, 5, and 6, part of the frame member 17A forms an electromagnetic shielding wall 50 inside the first chassis 12A. The electromagnetic shielding wall 50 extends between a branch portion 50a near the corner 42 on the chassis side surface 44a and a branch portion 50b a little apart from the corner 42 on the chassis side surface 44b. More specifically, the electromagnetic shielding wall 50 includes a first part 50c extending from the branch portion 50a in the X direction, a second part 50d curved from the end of the first part 50c to turn in the Y direction, a third part 50e extending from the end of the second part 50d in the X direction, and a fourth part 50f extending from the end of the third part 50e to the branch portion 50b. A component attachment piece 52 protrudes inward from the second part 50d.

A component placement table metal portion (radio wave non-transmissive placement table) 54 protrudes from the third part 50e toward the chassis side surface 44b. The component placement table metal portion 54 is a metal material integrated with the third part 50e, and is a radio wave non-transmissive material. A metal part of the frame member 17A including the component placement table metal portion 54 is configured to be electrically grounded. The front surface 54a (see FIG. 9) of the component placement table metal portion 54 substantially coincides with the electromagnetic shielding wall 50, and has a moderate thickness in the Z direction. A plurality of screw holes 54b and a plurality of positioning pins 54c are provided on the rear surface of the component placement table metal portion 54. Since the component placement table metal portion 54 is moderately thick, the screw holes 54b can be formed with no problem. The component placement table metal portion 54 is connected to the below-described component placement table resin portion 70 to thus form a component placement table 56.

The frame member 17A includes a chassis side surface member 57a that forms the chassis side surface of the corner 42, and a chassis side surface member 57b that extends from the chassis side surface member 57a in the X direction and forms the chassis side surface 44b. The chassis side surface members 57a and 57b are a metal material. The chassis side surface member 57a is arc-shaped.

A resin member 58 is provided so as to extend from the surrounding part of the corner 42 of the chassis side surface 44a along the edge 12Ac. In FIGS. 4 to 11, the resin member 58 is indicated by dots for easy identification. The resin member 58 forms part of the frame member 17A, and is integrally molded with other metal materials. The resin member 58 is a radio wave transmissive material. The resin member 58 includes a first resin part 60 in contact with the inside of the chassis side surface member 57b at the corner 42, a second resin part 62 extending from the first resin portion 60 in the X direction and in contact with the inside of the chassis side surface member 57b, and a third resin part 64 extending from the second resin part 62 in the X direction. The first resin part 60 is composed of an arc-shaped portion 60a along the chassis side surface member 57a and a fan-shaped portion 60b supporting the arc-shaped portion 60a from the inside.

The resin member 58 includes a radio wave window 66 that forms part of the chassis side surface 44a near the corner 42, and a radio wave window 68 that forms part of the chassis side surface 44b at a position a little apart from the corner 42 in the X direction. The radio wave window 66 is connected to the first resin part 60. The radio wave window 66 is located between the corner 42 and the branch portion 50a, and is short in the Y direction.

The radio wave window 68 extends from the vicinity of the branch portion 50b toward the corner 42, and is moderately long in the X direction. The radio wave window 68 is part of the third resin part 64. The component placement table resin portion 70 (radio wave transmissive placement table) protrudes from the third resin part 64 toward the inside of the first chassis 12A. The component placement table resin portion 70 is a resin material integrated with the third resin part 64, and is a radio wave transmissive material.

The radio wave windows 66 and 68 are provided for transmitting and receiving radio waves of the antenna module 32, and depending on design considerations, the number of wave windows may be one or more. The electromagnetic shielding wall 50 is provided so as to be parallel to the radio wave windows 66 and 68. That is, the electromagnetic shielding wall 50 and the radio wave windows 66 and 68 are in a parallel relationship with respect to the two branch portions 50a and 50b.

The ends of the component placement table resin portion 70 and the component placement table metal portion 54 are connected to form the component placement table 56. The rear surface 56a of the component placement table 56 is located a little forward from the rear end 50g of the electromagnetic shielding wall 50 (see FIG. 9). On the rear surface 56a, the component placement table resin portion 70 and the component placement table metal portion 54 occupy substantially equal areas. The front surface 70a of the component placement table resin portion 70 is substantially flush with the display surface of the display 16, and forms the attachment surface for the bezel 22 (see FIG. 9). The bezel 22 is fixed by adhesive tape 72 so as to extend from the edge of the display 16 to the front surface 70a.

The second resin part 62 is not provided with the component placement table resin portion 70 like the third resin part 64, and is moderately apart from the first part 50c of the electromagnetic shielding wall 50 to form a through portion 74. A bezel attachment wall 76 protrudes from the second resin part 62 toward the inside of the first chassis 12A. The front surface 76a of the bezel attachment wall 76 is continuous with the front surface 70a of the component placement table resin portion 70, where the bezel 22 is attached. The second resin part 62 has a thin portion 62a near the third resin part 64. Therefore, a wide portion 76b of the bezel attachment wall 76 along the thin portion 62a is slightly widened. A step portion 77 is located between the wide portion 76b and the rear surface 56a of the component placement table 56. That is, the wide portion 76b and the rear surface 56a are discontinuous in the Z direction with the step portion 77 interposed therebetween.

A plurality of sound holes 78 are formed side by side in the X direction in the chassis side surface member 57b and the second resin part 62. The sound holes 78 facilitate sound transmission from the speaker 34 to the outside. The second resin part 62 allows radio waves to pass between the antenna module 32 and the radio wave window 66.

A component installation space 80 is formed between the chassis side surfaces 44a and 44b and the electromagnetic shielding wall 50. The component installation space 80 is formed by an antenna placement space 82 and the foregoing through portion 74. The antenna placement space 82 is a space in which mainly the antenna module 32 is placed. The through portion 74 is a space in which mainly the speaker 34 is placed. The antenna placement space 82 is a bottomed space whose front is closed by the component placement table 56, unlike the through portion 74. The through portion 74 and the antenna placement space 82 communicate with each other in at least one part.

Figure 7:
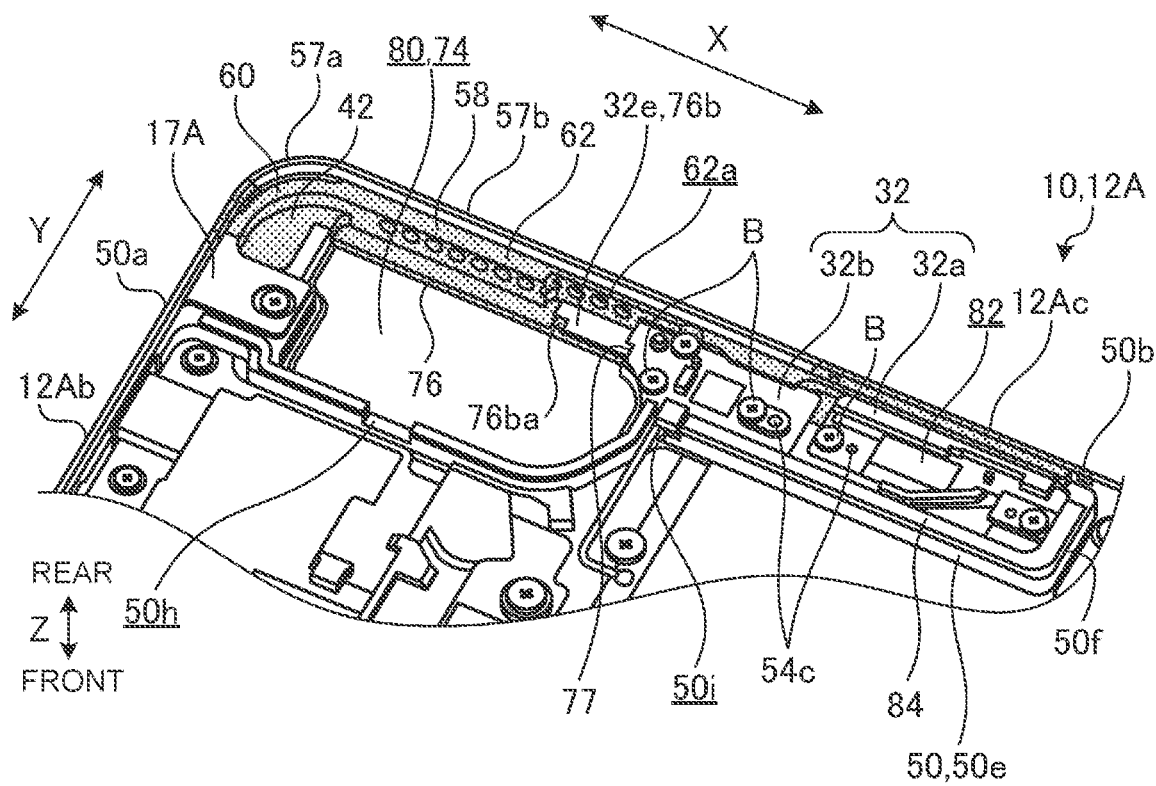
FIG. 7 is a partially enlarged perspective view of the first chassis in a state in which the cover member and a speaker have been removed.
Figure 8:
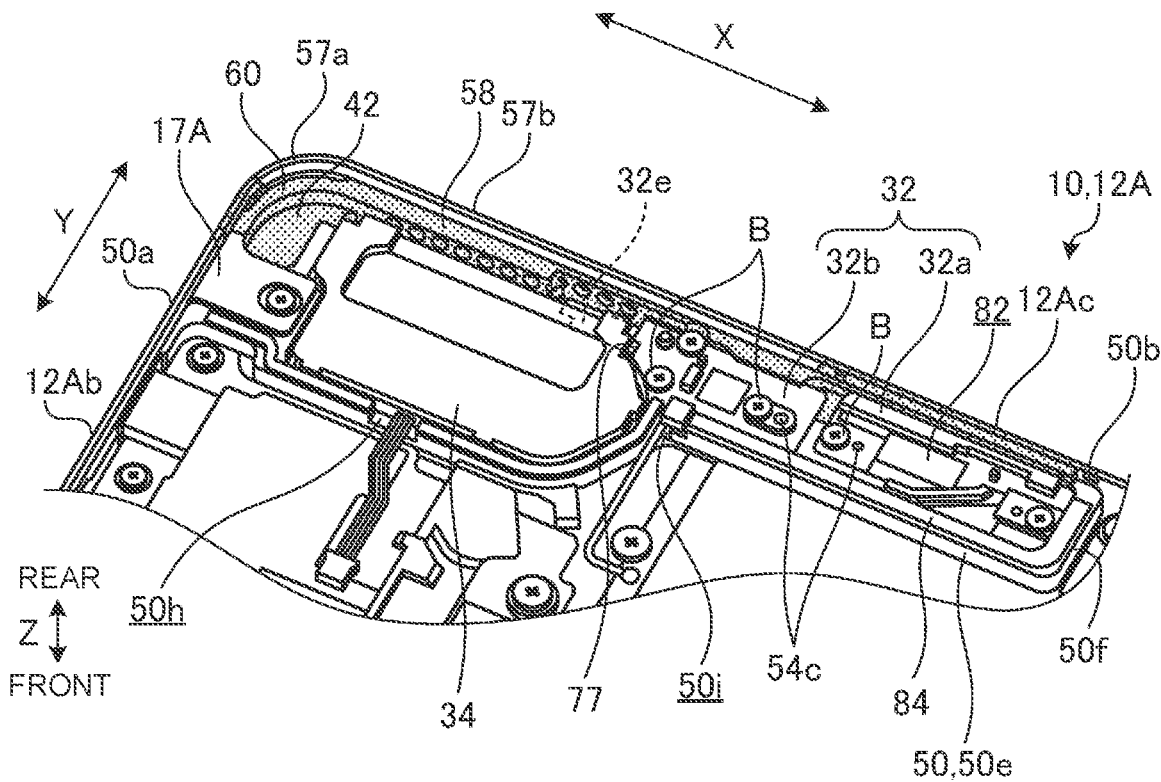
FIG. 8 is a partially enlarged perspective view of the first chassis in a state in which the cover member has been removed.
Figure 9:
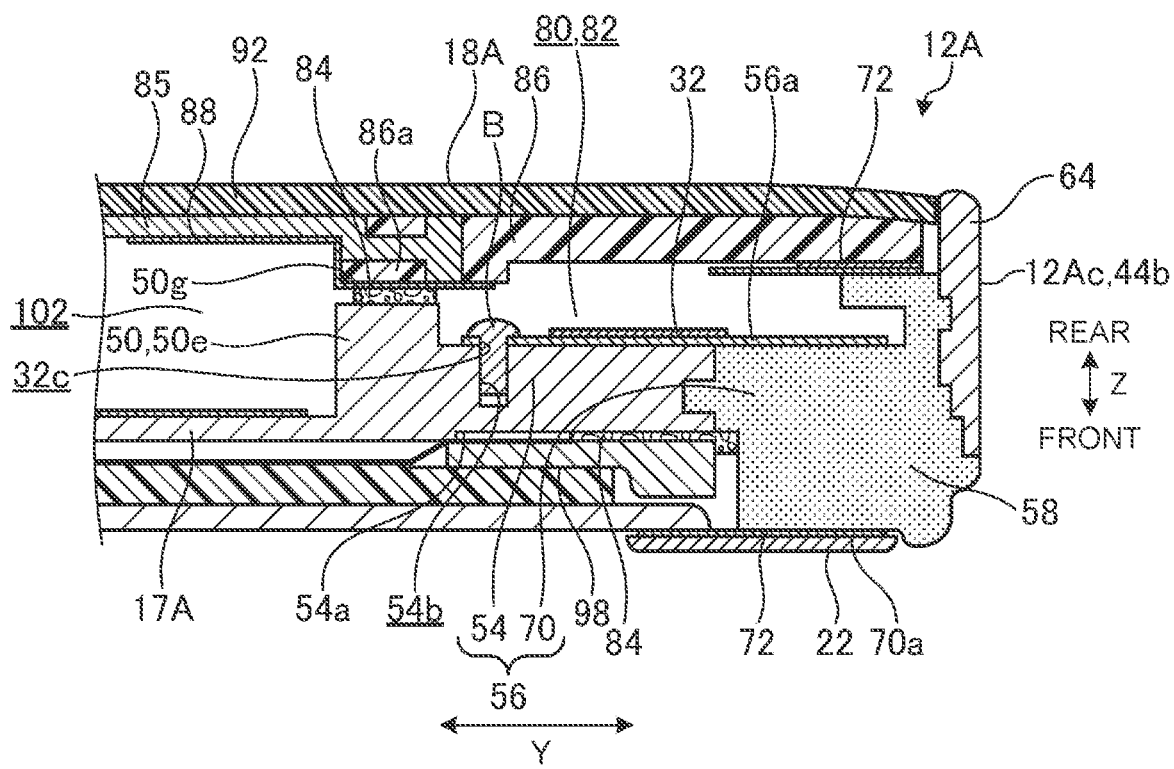
FIG. 9 is a sectional side view of a chassis side surface member, a second resin part, and their surroundings.
Figure 10:
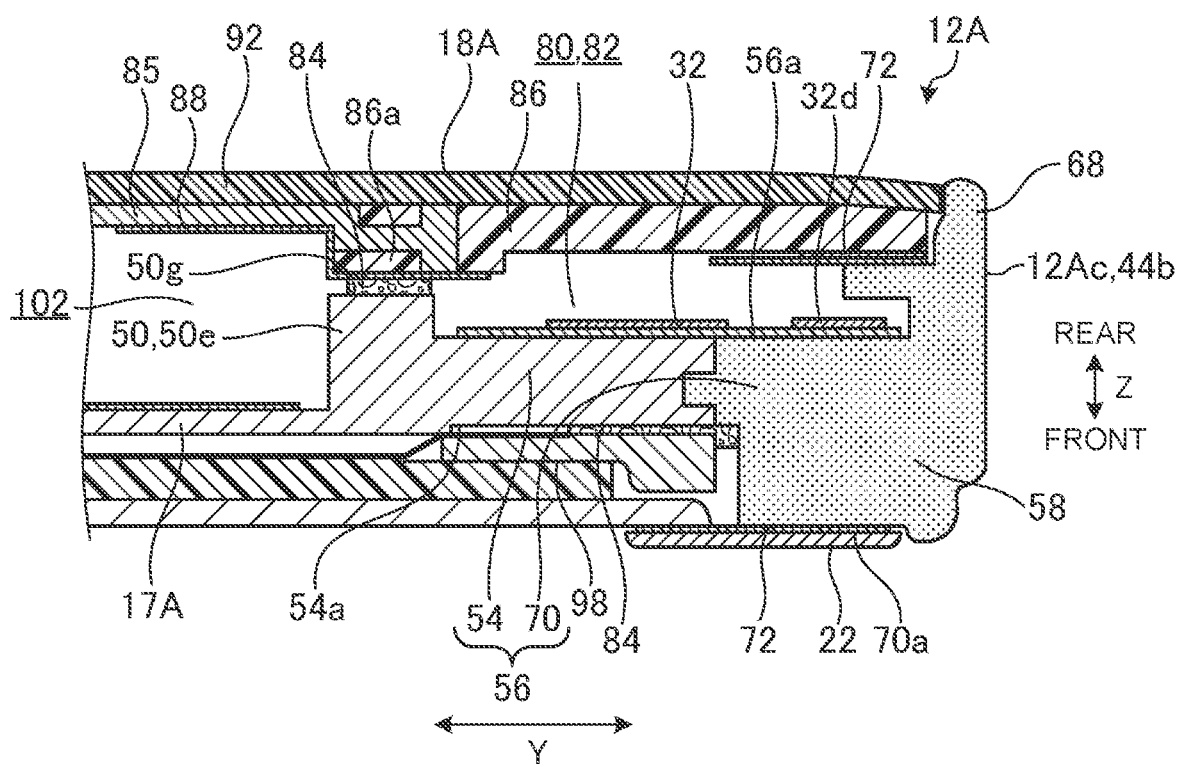
FIG. 10 is a sectional side view of a radio wave window and its surroundings.

FIG. 7 is a partially enlarged perspective view of the first chassis 12A in a state in which the cover member 18A and the speaker 34 have been removed. FIG. 8 is a partially enlarged perspective view of the first chassis 12A in a state in which the cover member 18A has been removed. FIG. 9 is a sectional side view of the chassis side surface member 57b, the second resin part 62, and their surroundings. FIG. 10 is a sectional side view of the radio wave window 68 and its surroundings.

Description will be made with reference to FIGS. 7, 8, 9, and 10. The antenna module 32 is composed of a first module 32a and a second module 32b. Here, the antenna module 32 is divided into two components for the convenience in layout and manufacture, and the antenna module 32 may be composed of one component depending on the conditions. In the following description, the first module 32a and the second module 32b are not particularly distinguished from each other.

The antenna module 32 is formed using a flexible substrate as a base, and is sufficiently thin and compact. The antenna module 32 itself does not have electromagnetic shieldability. The antenna module 32 has an elongated shape along the chassis side surface 44*b*, and most of the antenna module 32 is placed on the component placement table 56 in the antenna placement space 82. The antenna module 32 is fixed to the component placement table metal portion 54 with screws B. The antenna module 32 has holes 32*c* through which the screws B are inserted, and the screws B pass through the holes 32*c* and screw into the screw holes 54*b*.

The head portion of at least one of the screws B is in contact with the ground pattern of the antenna module 32. Hence, the antenna module 32 is grounded via the screws B and the component placement table metal portion 54, without providing another ground wire. The ground pattern of the antenna module 32 may be in direct contact with the component placement table metal portion 54, without the screws B therebetween. The component placement table metal portion 54 may have its metal surface exposed only in the part that is in contact with the ground pattern of the antenna module 32, and a protective film such as paint may be provided in the other parts. The antenna module 32 is positioned by the positioning pins 54*c*.

As illustrated in FIG. 10, the antenna module 32 is provided with an antenna element 32*d* on the side of the radio wave window 68 within the range of being placed on the component placement table resin portion 70. That is, the antenna element 32*d* is located at a position overlapping the component placement table resin portion 70 in a plan view. The antenna element 32*d* located at such position can transmit and receive radio waves laterally via the radio wave window 68, and transmit and receive radio waves forward via the component placement table resin portion 70 and the bezel 22. In other words, the component placement table resin portion 70 in this range is composed of a continuous resin material up to the radio wave window 68 on the chassis side surface and the front surface 70*a* serving as the chassis front surface, and can transmit and receive radio waves laterally and forward. Moreover, the front surface 70*a* can be used as the attachment surface for the bezel 22, as mentioned above. Furthermore, the cover member 18A in this range has radio wave transmissivity as described later, and the antenna element 32*d* can transmit and receive radio waves rearward via the cover member 18A.

Figure 11:
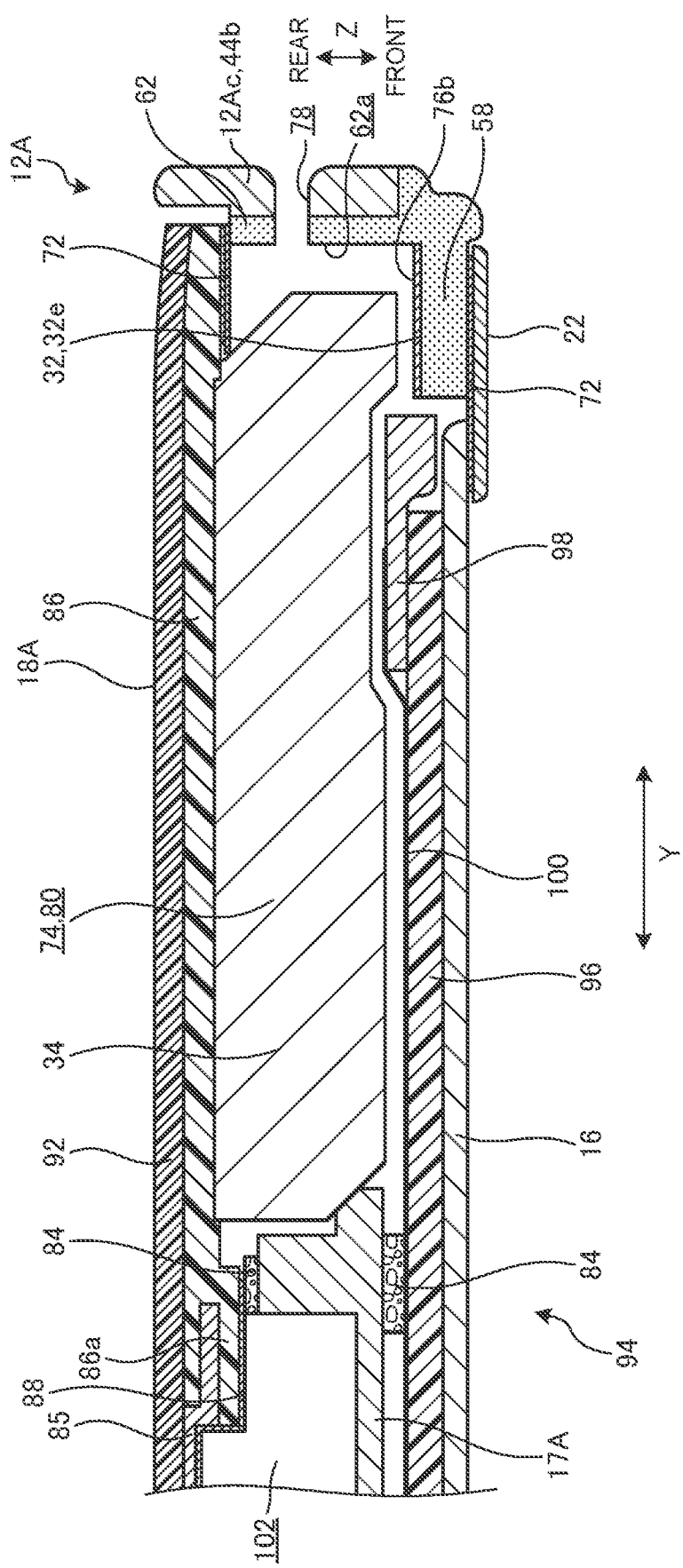
FIG. 11 is a sectional side view of the speaker and its surroundings.

FIG. 11 is a sectional side view of the speaker 34 and its surroundings. Description will be made with reference to FIGS. 7, 8, and 11. Most of the antenna module 32 is placed on the component placement table 56, but a protrusion piece 32*e* is placed on the wide portion 76*b* of the bezel attachment wall 76. The step portion 77 is located between the wide portion 76*b* and the rear surface 56*a*. Since the antenna module 32 is composed of a flexible substrate, placement can be made via the step portion 77, and the layout of the speaker 34 is not hindered. The protrusion piece 32*e* is positioned by a small projection 76*ba* of the wide portion 76*b*.

The protrusion piece 32*e* of the antenna module 32 overlaps the speaker 34 in a plan view. Since the speaker 34 and the antenna module 32 partially overlap each other, the total dimension in the X direction is shortened accordingly. Hence, the edge 12Ac is provided with a margin in layout, and the connector 30*a* (FIG. 3) can be provided. Since the speaker 34 and the antenna module 32 each have a large dimension in the X direction, partially overlapping them has a significant dimension reduction effect. Moreover, the bezel 22 can be narrowed by shortening the chassis dimension. Although the protrusion piece 32*e* overlaps the speaker 34 in a plan view, a narrow gap is provided in the Z direction, and thus there is no vibrational influence between the speaker 34 and the chassis.

The rear end 50*g* of the electromagnetic shielding wall 50 has electric wire extraction notches 50*h* and 50*i*. The electric wire extraction notch 50*h* is an electric wire extraction opening for the speaker 34, and the electric wire extraction notch 50*i* is an electric wire extraction opening for the antenna module 32. A cushion material 84 is provided on the rear edge of the electromagnetic shielding wall 50 except for the electric wire extraction notches 50*h* and 50*i*. The cushion material 84 is sponge, polyurethane, or the like, and has electrical conductivity and electromagnetic shieldability. Since the electric wire extraction notches 50*h* and 50*i* are narrow, certain electromagnetic shielding performance can be achieved in the component installation space 80 even though the cushion material 84 is not provided. As illustrated in FIG. 6, the cushion material 84 is also provided on the front surface of each of the first part 50*c*, the second part 50*d*, and the component placement table metal portion 54.

Figure 12:
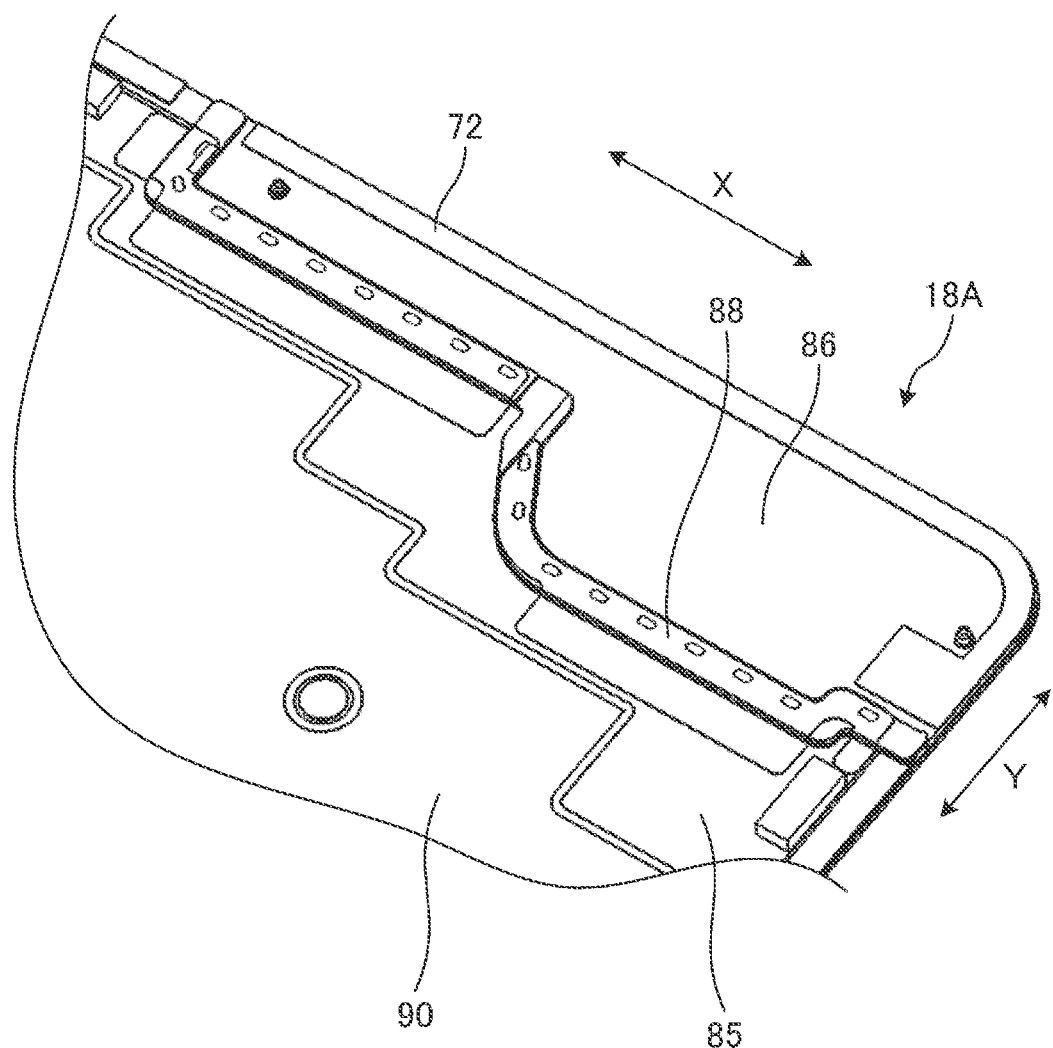
FIG. 12 is a perspective view illustrating part of the inner surface of the cover member.

FIG. 12 is a perspective view illustrating part of the inner surface of the cover member 18A. The cover member 18A in the range illustrated in FIG. 12 corresponds to the corner 42 and its surroundings. Of the cover member 18A, a corner resin portion 86 illustrated in FIG. 12 is made of a resin material, and substantially the entire surface including its surroundings is made of a metal material 85.

The corner resin portion 86 has the same shape as the component installation space 80 in a plan view, and is shaped to cover the component installation space 80. A low pedestal 86*a* is formed in the corner resin portion 86 at the boundary with the other metal member 85. Copper foil (conductive film) 88 is provided between the pedestal 86*a* and the metal material 85. Although the copper foil 88 having excellent conductivity is used because a relatively small area is sufficient for the copper foil 88, aluminum foil or the like may be used depending on the conditions. Adhesive tape 72 is provided at appropriate intervals on the edge of the cover member 18A. Reference symbol 90 in FIG. 12 is a protective film. A decorative plate 92 (see FIG. 11) is provided on the outer surface of the cover member 18A. The decorative plate 92 is made of a radio wave transmissive material.

Figure 13:
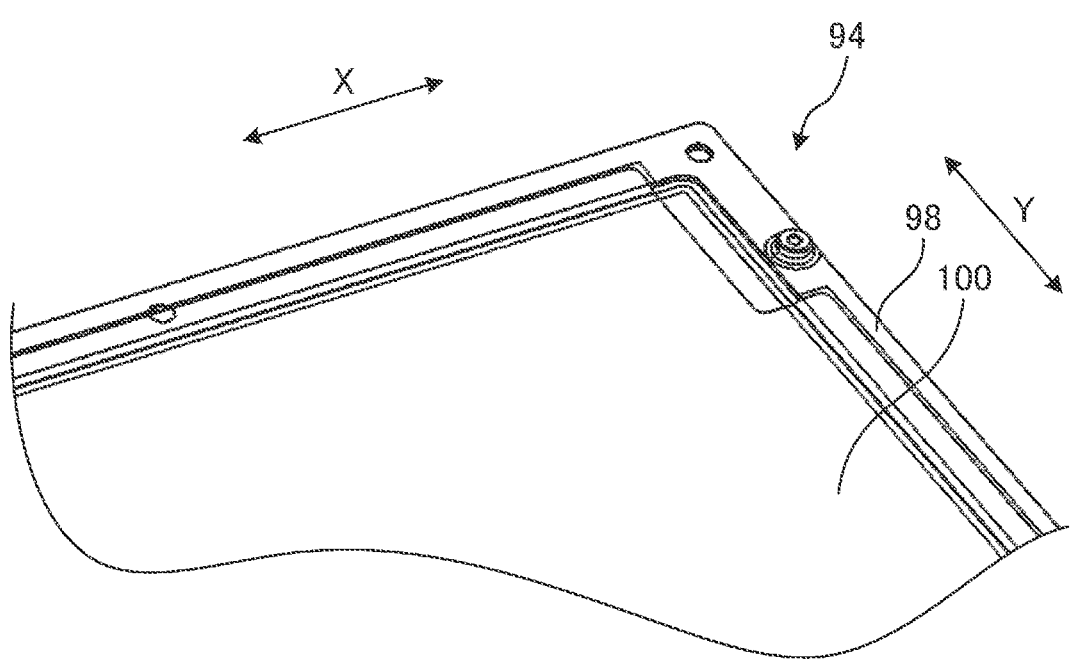
FIG. 13 is a perspective view illustrating part of the inner surface of a display unit.

FIG. 13 is a perspective view illustrating part of the inner surface of a display unit 94. The display unit 94 in the range illustrated in FIG. 13 corresponds to the corner 42 and its surroundings. As illustrated in FIGS. 11 and 13, the display unit 94 includes the foregoing display 16, a reinforcing plate 96 supporting the rear surface of the display 16, and a thin metal frame 98 provided around the display 16. The reinforcing plate 96 is made of CFRP, for example, and is not electrically conductive. The metal frame 98 is electrically conductive. Aluminum foil (conductive film) 100 is pasted on substantially the entire surface of the reinforcing plate 96. The aluminum foil 100 is in contact with the edge of the metal frame 98 and is electrically connected with the metal frame 98. Although the aluminum foil 100 which is inexpensive is used to cover substantially the entire surface of the reinforcing plate 96 having a relatively large area, copper foil or the like may be used depending on the conditions.

Referring back to FIGS. 9, 10, and 11, the space between the rear end 50*g* of the electromagnetic shielding wall 50 and the copper foil 88 of the pedestal 86*a* is closed with the cushion material 84. The space between the front of the electromagnetic shielding wall 50 and the aluminum foil 100 of the display unit 94 is also closed with the cushion material 84. On the front, the cushion material 84 is in direct contact with the aluminum foil 100 (see FIG. 11), or in contact with the aluminum foil 100 via the component placement table metal portion 54, the cushion material 84, and the metal frame 98 (see FIGS. 9 and 10).

The metal material 85, the frame member 17A, and the reinforcing plate 96 covered with the aluminum foil 100 are grounded at the same potential, and the internal space 102 of the first chassis 12A surrounded by them is electromagnetically shielded from the outside. This improves the noise resistance of the motherboard 26 and the like stored in the internal space 102, and also prevents the motherboard 26 from leaking electromagnetic noise to the outside. In addition, the space between the internal space 102 and the component installation space 80 is shielded to prevent the antenna element 32d from electromagnetically influencing the motherboard 26.

In the electronic apparatus 10 having the above-described structure, the component arrangement space 80 in which the antenna module 32 and the speaker 34 are arranged is laterally covered with the electromagnetic shielding wall 50, and thus the antenna module 32 itself does not require electromagnetic shielding means such as a wall. This enables reduction in size and thickness. There is a degree of freedom in arranging the antenna module 32 and the speaker 34 in the component arrangement space 80, and shielding means corresponding to the electromagnetic shielding wall 50 is not necessary at least between the antenna module 32 and the speaker 34, with it possible to save space.

Since the antenna module 32 does not require electromagnetic shielding means, a flexible substrate can be used to considerably reduce the thickness, with it being possible to increase the degree of freedom in layout. Since the antenna module 32 is thin, a part (protrusion piece 32e) can be located at a position overlapping the speaker 34 in a plan view. This reduces the dimension in the X direction, and allows the connector 30e to be placed accordingly. The electronic apparatus 10 can thus be made compact as a whole. While a typical antenna module includes a screw attachment piece so as to accompany the electromagnetic shielding wall, the antenna module 32 is composed of a flexible substrate and accordingly it suffices to form the holes 32c through which the screws B are passed. Further reduction in size and space can thus be achieved.

The antenna module 32 is composed of a flexible substrate and is flexible. Hence, it is possible to place the main part on the component placement table 56 and place the protrusion piece 32e on the wide portion 76b by causing the protrusion piece 32e to slip into the front of the speaker 34 through the step portion 77.

The speaker 34 is used together with the speaker 46 as a pair, and accordingly is located at the corner 42. The component arrangement space 80 is configured to be laterally covered with the electromagnetic shielding wall 50. For the antenna module 32, it is preferable to provide the radio wave windows 66 and 68 on the two chassis side surfaces 44a and 44b. Such component arrangement space 80 is suitable for storing the antenna module 32 and the speaker 34 at a location including the corner 42. Since the speaker 34 has a relatively large volume among the electrical components provided along the edges of the first chassis 12A, combining the speaker 34 with the small and thin antenna module 32 enhances the degree of freedom in layout of the antenna module 32 and the speaker 34.

The antenna module 32 can transmit and receive radio waves through the radio wave window 66 of the outer edge 12Ab and the radio wave window 68 of the edge 12Ac. Since the radio wave windows 66 and 68 are exposed to the chassis side walls 44a and 44b, the boundaries with the metal material in the chassis side walls 44a and 44b tend to be weak in strength. In the electronic apparatus 10, however, the electromagnetic shielding wall 50 is made of a metal material and is located so as to be parallel to the radio wave windows 66 and 68 and bypass. The electromagnetic shielding wall 50 thus functions as a reinforcing member to ensure the strength.

Although the chassis side surface member 57b is made of a metal material, the second resin part 62 is located on the inside of the chassis side surface member 57b, which causes the chassis side surface member 57b to be thinner. Moreover, the plurality of sound holes 78 are formed, so that the strength of the chassis side surface member 57b is not very high. In the electronic apparatus 10, however, the electromagnetic shielding wall 50 also ensures the strength of this part. The inventor of the present application confirmed by simulation that the electromagnetic shielding wall 50 reduces the amount of deformation and stress when an external force is applied to the corner 42.

The component arrangement space 80 is divided into the bottomed antenna placement space 82 closed by the component placement table 56 and the through portion 74. That is, part of the electromagnetic shielding wall 50 and the chassis side surface are connected to each other via the component placement table metal portion 54 and the component placement table resin portion 70 continuous with the component placement table metal portion 54 to form the component placement table 56, and part of the electromagnetic shielding wall 50 and the chassis side surface member 57b are separated from each other to form the through portion 74. Alternatively, the entire component arrangement space 80 may be a through space or a bottomed space depending on the design conditions.

The component placement table 56 is suitable for placing the thin antenna module 32. The component placement table metal portion 54 in the component placement table 56 is suitable for fixing the antenna module 32 with the screws B and for electrical connection to the ground. The antenna module 32 does not require a dedicated ground wire and its routing and can be easily removed by simply removing the screws B, which eases maintenance. The component placement table resin portion 70 in the component placement table 56 is suitable for transmitting and receiving radio waves for the antenna element 32d. The component placement table 56 also functions as a reinforcing material like a backing material for the radio wave window 68. The through portion 74 is suitable for placing the speaker 34 large in volume.

The present invention is not limited to the above-described embodiments, and can be freely changed without departing from the gist of the present invention.

DESCRIPTION OF SYMBOLS 10 electronic apparatus
12A first chassis
12Aa adjacent edge
12Ab outer edge
12Ac edge
14 hinge device
16 display
17A frame member (chassis member)
18A cover member (cover)
22 bezel 32 antenna module
32c hole
32d antenna element
32e protrusion piece
34, 46 speaker
42 corner
44a, 44b chassis side surface
50 electromagnetic shielding wall
50b branch portion
54 component placement table metal portion (radio wave non-transmissive placement table)
56 component placement table
58 resin member
66, 68 radio wave window
70 component placement table resin portion (radio wave transmissive placement table)
74 through portion
76 bezel attachment wall
76b wide portion
77 step portion
80 component arrangement space
82 antenna placement space
84 cushion material
85 metal material
86 corner resin portion
88 copper foil (conductive film)
100 aluminum foil (conductive film)

What is claimed is:

1. An electronic apparatus comprising:
a chassis side surface formed by a chassis member;
an electromagnetic shielding wall of a radio wave non-transmissive material formed by the chassis member;
a component installation space located between the chassis side surface and the electromagnetic shielding wall; and
an antenna module and an electrical component arranged in the component installation space,
wherein the electromagnetic shielding wall at least covers laterally an antenna element in the antenna module,
wherein the chassis member is a composite structure of a metal material and a resin material that is integrally molded to an interior surface of the metal material, and
wherein the resin material extends from the interior surface of the metal material to fill holes formed in the metal material to form one or more radio wave windows in the chassis side surface for transmitting and receiving radio waves of the antenna module.

2. The electronic apparatus according to claim 1,
wherein the electromagnetic shielding wall is a metal material and is located to be parallel to the one or more radio wave windows.

3. The electronic apparatus according to claim 1,
wherein at least part of the electromagnetic shielding wall and a chassis side surface member forming the chassis side surface are separated from each other to form a through portion, and
wherein the electrical component is located in the through portion.

4. The electronic apparatus according to claim 1,
wherein at least part of the electromagnetic shielding wall and the chassis side surface are connected to each other via a radio wave non-transmissive placement table integrated with the electromagnetic shielding wall and a radio wave transmissive placement table continuous with the radio wave non-transmissive placement table, and
wherein the antenna module is placed from the radio wave non-transmissive placement table to the radio wave transmissive placement table.

5. The electronic apparatus according to claim 4,
wherein the radio wave non-transmissive placement table is the metal material, and
wherein the antenna module is fixed to the radio wave non-transmissive placement table by a screw and is electrically connected to a ground pattern.

6. The electronic apparatus according to claim 4,
wherein the radio wave transmissive placement table is made of a single continuous material from the chassis side surface to a chassis front surface, and
wherein the antenna element in the antenna module is located at a position overlapping the radio wave transmissive placement table in a plan view.

7. The electronic apparatus according to claim 1,
wherein the antenna module and the electrical component are arranged to partially overlap each other in a plan view.

8. The electronic apparatus according to claim 1, comprising
a cover covering one side of a chassis,
wherein a part of the cover covering the component installation space is a radio wave transmissive material and a part of the cover surrounding the part is a radio wave non-transmissive material having conductivity,
wherein a conductive film is located from the part of the radio wave transmissive material to the part of the radio wave non-transmissive material in the cover, and
wherein a space between the electromagnetic shielding wall and the conductive film is closed with a conductive cushion material.

9. The electronic apparatus according to claim 1, comprising:
a display covering one side of the component installation space;
a conductive film located on an inner surface of the display; and
a conductive cushion material closing a space between the electromagnetic shielding wall and the conductive film.

10. The electronic apparatus according to claim 1,
wherein the antenna module is composed of a flexible substrate.

11. The electronic apparatus according to claim 1,
wherein the electrical component is a speaker.

12. The electronic apparatus according to claim 1,
wherein the one or more radio wave windows include:
a first window that forms part of the chassis side surface along a first axis of the electronic apparatus; and
a second window that forms part of the chassis side surface along a second axis of the electronic apparatus that is perpendicular to the first axis.

13. An electronic apparatus comprising:
a chassis side surface formed by a chassis member;
an electromagnetic shielding wall of a radio wave non-transmissive material formed by the chassis member;
a component installation space located between the chassis side surface and the electromagnetic shielding wall; and
an antenna module and an electrical component arranged in the component installation space,
wherein the electromagnetic shielding wall at least covers laterally an antenna element in the antenna module,
wherein at least part of the electromagnetic shielding wall and the chassis side surface are connected to each other via a radio wave non-transmissive placement table integrated with the electromagnetic shielding wall and a radio wave transmissive placement table continuous with the radio wave non-transmissive placement table, and wherein the antenna module is placed from the radio wave non-transmissive placement table to the radio wave transmissive placement table.

14. An electronic apparatus comprising:

a chassis side surface formed by a chassis member;

an electromagnetic shielding wall of a radio wave non-transmissive material formed by the chassis member;

a component installation space located between the chassis side surface and the electromagnetic shielding wall;

an antenna module and an electrical component arranged in the component installation space; and a cover covering one side of a chassis, wherein the electromagnetic shielding wall at least covers laterally an antenna element in the antenna module, wherein a part of the cover covering the component installation space is a radio wave transmissive material and a part of the cover surrounding the part is a radio wave non-transmissive material having conductivity, wherein a conductive film is located from the part of the radio wave transmissive material to the part of the radio wave non-transmissive material in the cover, and wherein a space between the electromagnetic shielding wall and the conductive film is closed with a conductive cushion material.

* * * * *